United States Patent [19]

Gambetti

[11] Patent Number: 5,797,478
[45] Date of Patent: Aug. 25, 1998

[54] SYSTEM FOR THE ORDERED TRANSFER OF OBJECTS BETWEEN AT LEAST TWO CONVEYOR LINES DISPOSED SUBSTANTIALLY AT A RIGHT ANGLE TO ONE ANOTHER

[75] Inventor: Mario Gambetti, Bologna, Italy

[73] Assignee: Baumer S.R.L., Castelfranco Emilia, Italy

[21] Appl. No.: 543,594

[22] Filed: Oct. 16, 1995

[30] Foreign Application Priority Data

Oct. 21, 1994 [IT] Italy .................. BO94A0464

[51] Int. Cl.⁶ .................................................. B65G 29/00
[52] U.S. Cl. ................................... 198/441; 198/457
[58] Field of Search ........................ 198/441, 436, 198/456, 457, 408, 459.2, 459.6, 461.1, 598

[56] References Cited

U.S. PATENT DOCUMENTS 4,033,447  7/1977  Heier ........................................ 198/441
4,164,997  8/1979  Mueller ................................ 198/441 X

FOREIGN PATENT DOCUMENTS

| 2 088 058 | 1/1972 | France. |
| 2 262 635 | 9/1975 | France. |
| 2 346 255 | 10/1977 | France. |
| 2 599 332 | 5/1987 | France. |
| 419199 | 9/1925 | Germany ............................. 198/441 |
| 2 145 599 | 5/1972 | Germany. |
| 473786 | 10/1937 | United Kingdom ................. 198/441 |

*Primary Examiner*—Donald W. Underwood
*Attorney, Agent, or Firm*—Herbert Dubno; Yuri Kateshov

[57] ABSTRACT

An apparatus for receiving a line of containers and sorting them out so that a plurality of containers while being delivered by a supply line are separated and each of the containers is detected and rerouted on at least one exit line extending perpendicular to the supply line has at least one rotary device formed with a plurality of cells cooperating with the exit line in a controlled manner.

9 Claims, 7 Drawing Sheets

5,797,478

1

SYSTEM FOR THE ORDERED TRANSFER OF OBJECTS BETWEEN AT LEAST TWO CONVEYOR LINES DISPOSED SUBSTANTIALLY AT A RIGHT ANGLE TO ONE ANOTHER

SPECIFICATION

1. Field of the Invention

The present invention relates to a system for the ordered transfer of objects between at least two conveyor lines disposed substantially at a right angle to one another, whether coplanar or at different levels, or between a first conveyor line and a plurality of second conveyor lines disposed in the above mentioned manner.

2. Description of Prior Art

At present, systems for the ordered transfer of objects between two conveyor lines disposed in a coplanar manner and at a right angle to one another substantially comprise a transfer station positioned between the downstream end of the first conveyor line and the upstream end of the second conveyor line, wherein this station comprises one or more linear thrust devices provided with a linear reciprocating movement transverse to the first line and actuated intermittently, which push the objects successively positioned in this station one after the other from the first conveyor line to the second conveyor line causing them to slide on a table.

These systems resolve the technical problem of transferring objects from a first conveyor line to a second conveyor line disposed at a right angle to and coplanar with the first line, but have a number of drawbacks.

An initial drawback of the above system is due to the fact that in order to remedy interference between the successive object and the operational thrust device (or actuating rod), this successive object may be supplied to the transfer station only when the thrust device has returned to the retracted position of the beginning of its stroke with the result that the flow of objects being supplied to the transfer station has to take place non-continuously and/or very slowly and/or with a substantial interval between the objects, giving rise to a reduced production capacity.

A second drawback of the above system is due to the fact that the objects, during the transfer stage, slide on the table of the transfer station which leaves streaks on the sliding surface of the objects such that they are not visually pleasing to future consumers.

A third drawback of this known system is due to the fact that it is not adapted for the positive transfer of objects between conveyor lines positioned at different levels, i.e. not coplanar with one another.

A further drawback of the above system lies in the fact that it is not adapted for the positive transfer of objects supplied from a first conveyor line to a plurality of second conveyor lines, wherein this plurality of second conveyor lines are positioned in a coplanar manner or at different levels.

OBJECT OF THE INVENTION

The object of the present invention is to provide an assembly overcoming the above-mentioned drawbacks.

SUMMARY OF THE INVENTION

The invention resolves the problem of creating such a system.

2

The use of the system according to the invention achieves the following results: the objects are supplied continuously, at a faster speed and with a smaller interval to the transfer station; the objects do not slide on any surface in this transfer station; the objects may also be positively transferred between at least two conveyor lines that are not coplanar; the objects may be transferred positively from a single first conveyor line to a plurality of second conveyor lines disposed coplanar with the first line or at different levels with respect to the first line and/or with respect to one another.

The use of the inventive system provides the following advantages: higher production capacity; handling of the objects that does not entail streaking or damage; an efficient, effective and reliable positive transfer of the objects between two conveyor lines disposed substantially at a right angle to one another both in the case in which these two lines are disposed coplanar with one another and in the case in which these lines are disposed at different levels; an efficient, effective and reliable positive transfer of the objects between a first conveyor line and a plurality of second conveyor lines disposed coplanar with the first line or at different levels with respect to the first line and/or with respect to one another.

BRIEF DESCRIPTION OF THE DRAWINGS

Further characteristic features and advantages of the present invention are set out in in the following description, with reference to the accompanying drawings, in which.

SPECIFIC DESCRIPTION

Figure 1:
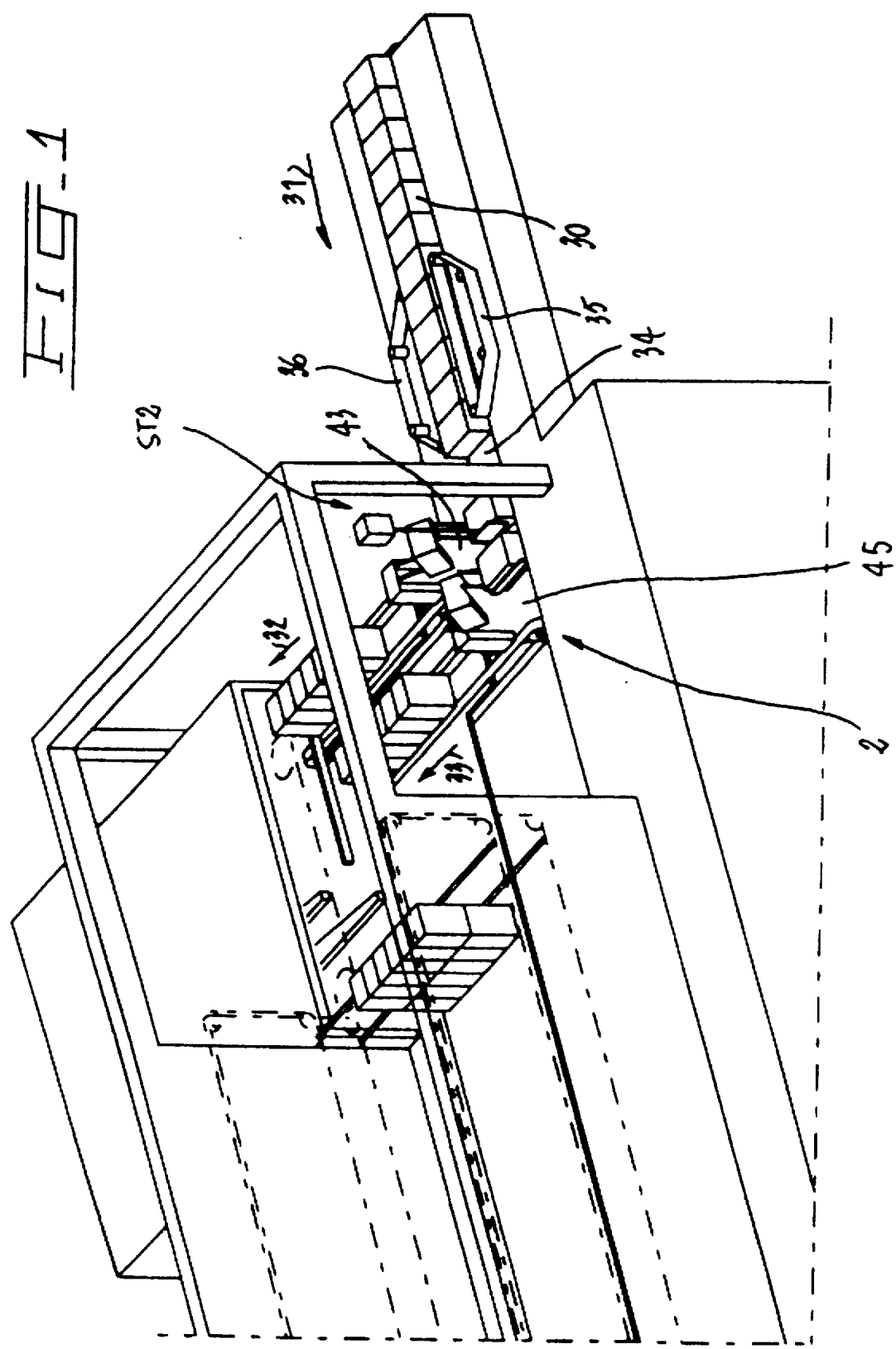
FIG. 1 is a perspective view of a machine assembly to which the system of the present invention is applied.

FIG. 1 shows a packaging machine provided with the vertical stacking system disclosed in a further application for a patent of industrial invention filed in the Italian Patent Office on the same date under number BO94 A000465 in the same name of the applicants for this patent application, upstream of which there is applied the second embodiment of the present patent application, adapted for the ordered transfer of objects 30 supplied from a first conveyor line 31 in a transfer station, to two second conveyor lines 32 and 33, wherein these two conveyor lines 32 and 33 are disposed at a right angle to the first line 31 and wherein these second conveyor lines 32 and 33 are disposed at different levels to one another, so that operations for the vertical stacking of the objects as set out in the above mentioned patent application can be carried out.

First Embodiment

Figure 2:
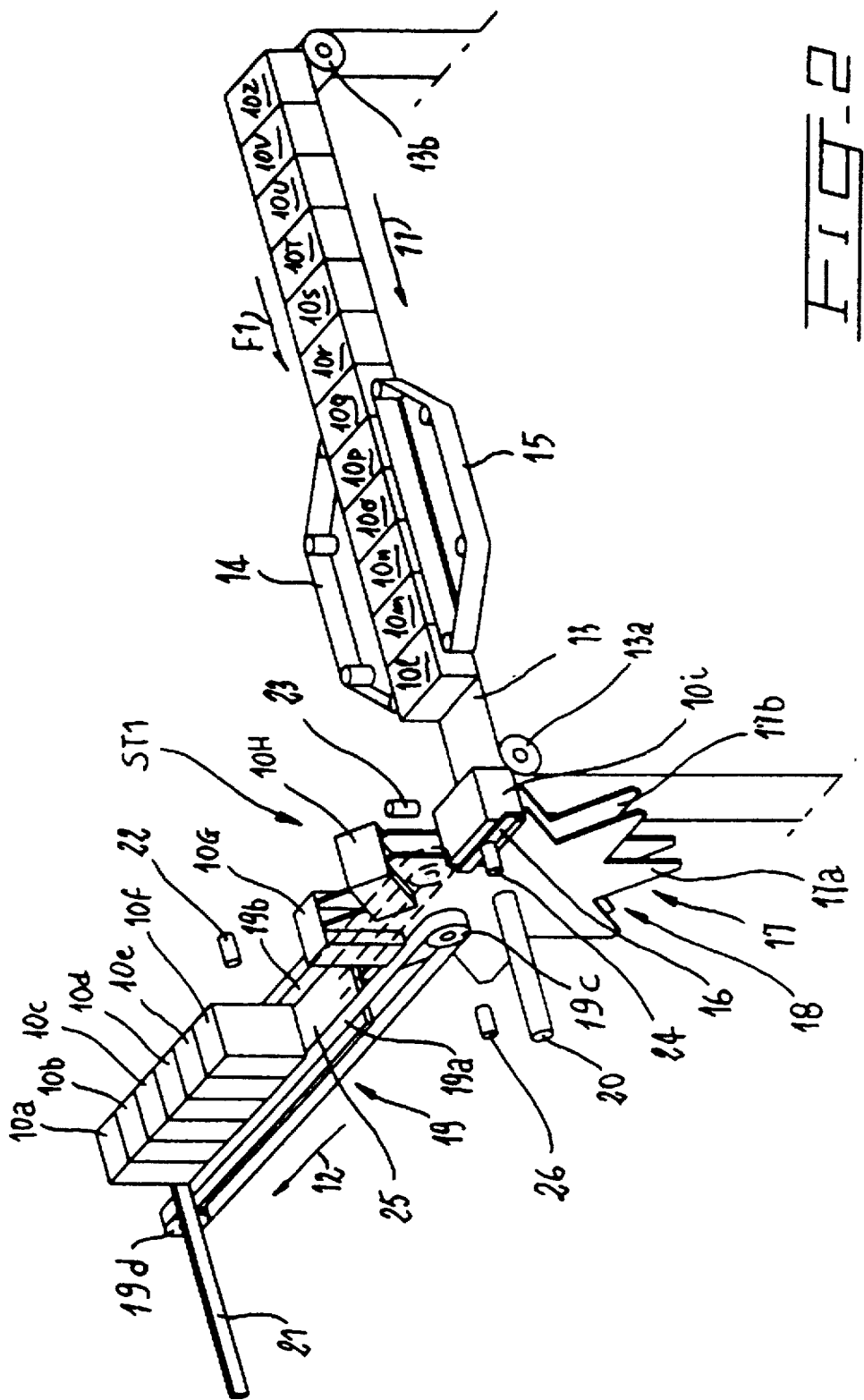
FIG. 2 is a diagrammatic perspective view showing a first embodiment of the system of the present invention, adapted to transfer objects between two conveyor lines disposed substantially at a right angle to and coplanar with one another.

FIG. 2 shows a first embodiment of the essential features of the system of the present invention, i.e. adapted to transfer objects 10 supplied by a first conveyor line 11 to a second conveyor line 12, in which the conveyor lines 11 and 12 are disposed perpendicular to and coplanar with one another and in which a transfer station ST1 for the transfer of the objects 10 between the two conveyor lines 11 and 12 is located between the downstream end of the first conveyor line 11 and the upstream end of the second conveyor line 12.

FIG. 2 also shows that the system comprises a first conveyor 13 of a known type with a single closed-loop conveyor belt, fed on rollers 13a and 13b supported by the machine structure (not shown), wherein this conveyor 13 conveys, in a downstream direction as shown by the arrow F1, parallelepipedic objects bearing the reference numeral 10 followed by a letter that increases in relation to the upstream position of the individual objects 10.

The lateral surfaces of the line of objects 10 disposed on the conveyor 13 are acted upon, just before they enter the transfer station ST1, by a pair of decelerator belts 14 and 15 of known type, actuated at a slower speed than that of the conveyor 13 for reasons that will be explained below.

The transfer station ST1 comprises a fixed end-of-stroke stop member 16 for the objects 10 and a rotary member 17, disposed with its axis of rotation 20 parallel to the first conveyor line 11 and perpendicular to the second conveyor line 12, such that this rotary member 17 rotates in a vertical plane perpendicular to the first conveyor line 11 and aligned centrally with the second conveyor line 12.

The rotary member 17 comprises two adjacent facing disks 17a and 17b keyed on the same axis 20, which are provided with peripherally spaced cells or housings 18 configured so as to allow the correct positioning of the objects 10 therein.

A second closed-loop conveyor 19 of the type with a parallel double conveyor belt 19a and 19b has the two upstream ends of these two belts 19a and 19b disposed adjacent to the lateral walls of the rotary member 17, without interfering therewith, and fed on respective rollers 19c, 19d supported by the machine structure (not shown). A sliding plate 25 for the support of these belts 19a and 19b is also provided as well as, in the vicinity of the downstream end of the conveyor 19, a second stop member 21.

The objects 10 are disposed in continuous sequence, by known devices, on the upstream end of the conveyor 13 which conveys them downstream. Just before the objects 10 enter the station ST1, these objects 10, in particular 10l, 10m, 10n, 10o and 10q, are acted upon by the two lateral decelerator belts 14 and 15 which reduce the speed of transport of the line of objects facing downstream in order to space the individual objects 10, in particular the objects 10i and 10l.

The individual objects 10, spaced in this way, are supplied individually to the transfer station ST1, and the stop member 16 stops them at a fixed point, as shown by object 10i in particular.

The rotary member 17, provided with an intermittent movement, is in a rest condition during this stop stage, and has a cell 18 positioned in a first position in the vicinity of the output end of the conveyor 13, so as to receive and accept the object 10i during the stop stage.

As soon as the object 10i is in position in the cell 18, the rotary member 17 performs a single intermittent step, bringing the subsequent cell 18 into position in the station ST1 so that the subsequent object 10l can be loaded in the manner described above.

The objects 10, disposed in the cells 18 of the rotary member 17 at each step, are conveyed along an arcuate trajectory until they reach the vicinity of the upstream end of the second conveyor 19, where the cells 18 are paused so as to allow the upstream end of the conveyor belts 19a and 19b to engage the base surface of the individual objects 10, in particular the object 10g, and convey these objects downstream initially against the stop member 21 then against one another.

The cells 18 are configured and disposed on the rotary member 17 so as to match the profile of the object 10 to be transferred and so that at each pause of the rotary member 17 a cell 18 is in the correct position to receive an object 10i from the first conveyor 13 and another cell 18 is in the correct position to deposit an object 10g on the second conveyor 19.

It should also be noted that the rotary member 17 may be associated with known counter-detector devices (for instance a counter device 26 adapted to count the number of steps of the rotary member 17 or a detector device 22 adapted to detect the upstream extension of the line of objects 10 disposed on the second conveyor) in order to achieve an ordered and metered transfer of objects 10 and/or a predetermined number of objects to the second conveyor 19.

Optionally, the control of the correct arrangement of the objects 10 within the respective cells 18 can be detected by various known devices, for instance by a sensor 23 which detects the presence or absence of the object in the cell 18 during the loading stage, or by a sensor 24 applied to the stop member 16, or by other devices selected in relation to the type of objects 10 to be transferred and connected to the machine control and management system.

The motor drive of the above-mentioned system may be of the mechanical and/or electrical and/or electronic and/or computerised type, well known to a person skilled in the art and not described in detail here as it lies outside the scope of the inventive concept of the present application.

With reference to the objects set out above, it should be noted that with the system described above, the objects 10 to be transferred are supplied continuously to the station ST1, since the rotary member 17, as soon as the object 10 is loaded in the respective cell 18, carries out the intermittent step in order to position the subsequent cell 18 in less time than the subsequent article 10 needs to reach the stop 16.

It should be noted, moreover, that during their transfer the objects 10 do not slide on any table and are always kept in the cells 18, i.e. they are subject to a so-called "positive" transfer free from sliding.

Second Embodiment

FIG. 1 and FIGS. 3 to 7 show a second embodiment of the system of the present invention in which this second embodiment is adapted to transfer the objects 30a, 30b, 30c, etc., between a first conveyor line 31 and two separate second conveyor lines 32 and 33 disposed at a right angle to this first line 31 and in which these second conveyor lines 32 and 33 are disposed at different levels; in this particular case, the line 33 is lower than the line 32.

This second embodiment comprises a conveyor 34 and two lateral decelerator conveyors 35 and 36 whose operation is similar to that described in the first embodiment set out above and is adapted to space the individual objects 30a, 30b and 30c.

The conveyor 34, in the vicinity of its downstream end entering the transfer station ST2, is fed downwards by the roller 37, fed upwards by a roller 38 and again fed downwards by a roller 39 so as to close (not shown) the closed loop in a known manner.

Figure 3:
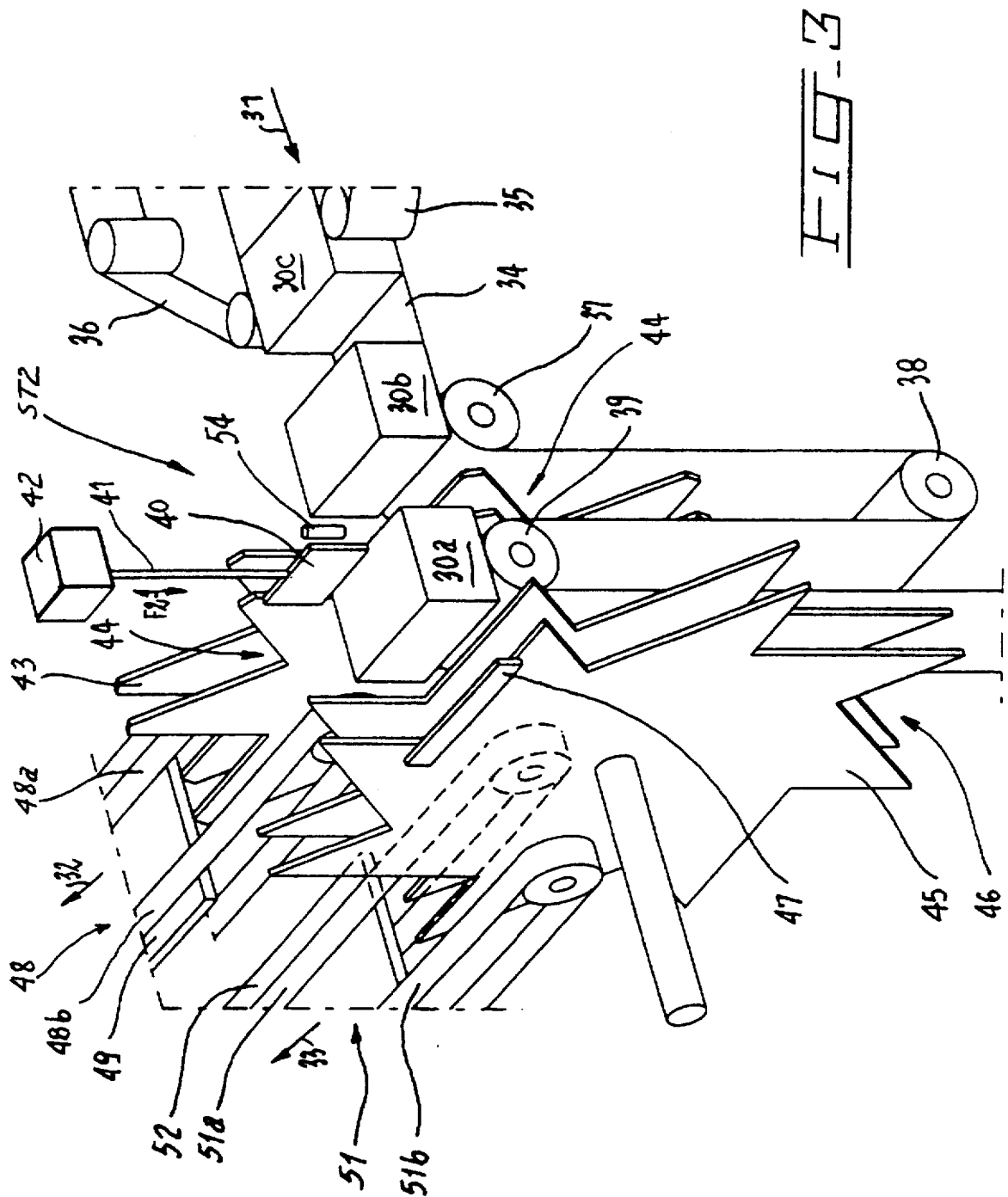
FIG. 3 is a diagrammatic view, on an enlarged scale, of a second embodiment of the system of the present invention, adapted to transfer objects from a first conveyor line to two second conveyor lines disposed substantially at a right angle to the first conveyor line and disposed at different levels to one another.
Figure 4:
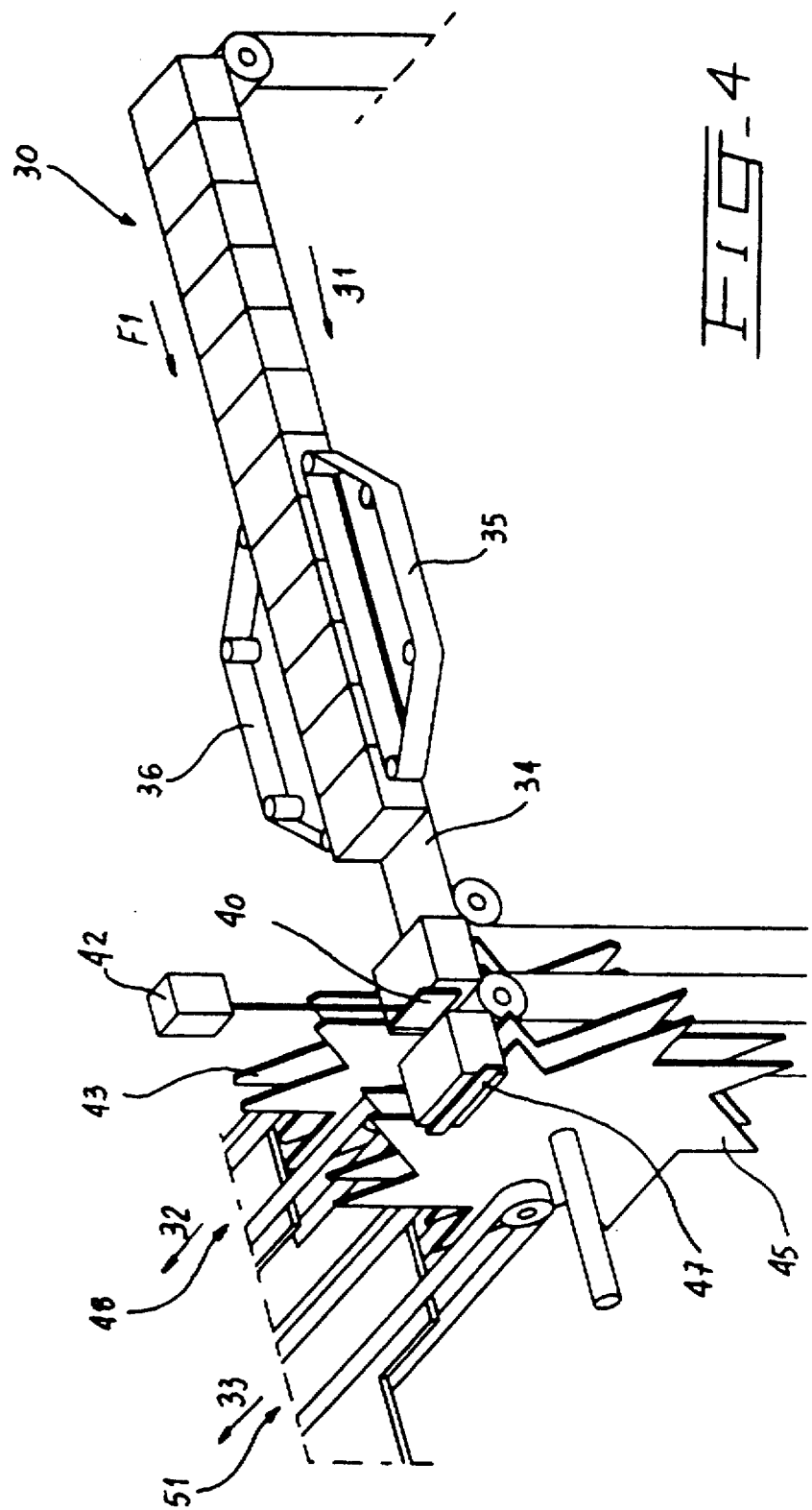
FIG. 4 is a diagrammatic perspective view of the system of FIG. 3 during a subsequent operating stage.

The transfer station ST2, as shown in particular in FIG. 2, comprises a first stop member 40 moving vertically in the direction of the arrow F2, connected by a rod 41 to an oscillator device 42 of known electromagnetic or pneumatic type, such that this stop member 40, on command, may assume two different positions: a first raised position, shown in FIG. 3, in which its lower end is positioned above the upper end of the objects 30 allowing these objects to pass freely thereunder and a second lowered position, shown in FIG. 4, in which the lower end is positioned below the upper end of the objects 30 preventing any further movement by these objects.

A first rotary member 43 with associated cells 44, similar to that described in the first embodiment, rotates in a vertical plane perpendicular to the first conveyor line 31, passing freely between the two rollers 37 and 39, and is disposed in alignment with the conveyor line 32.

Alongside the roller 39, in the downstream direction, there is a second similar rotary member 45 with associated cells 46, adapted to rotate in a respective vertical plane perpendicular to the first conveyor line 31, passing freely between the roller 39 and a second fixed stop member 47, and aligned with the conveyor line 33.

Figure 7:
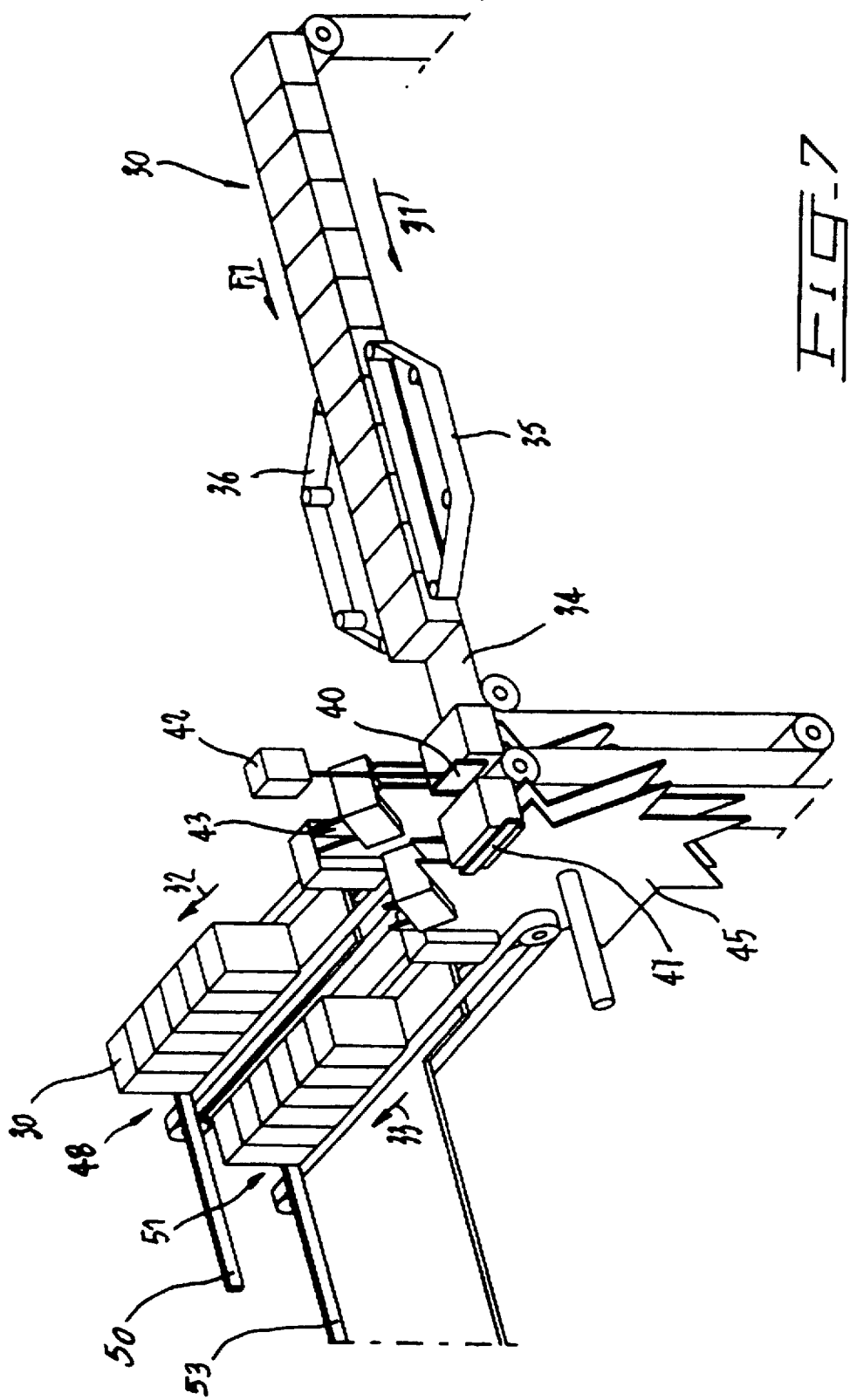
FIG. 7 is a diagrammatic perspective view of the system of FIG. 6 during a subsequent operating stage.

The conveyor line 32 comprises a conveyor 48 with a double conveyor belt 48a and 48b, a support plate 49 and, in the vicinity of the downstream end, as shown in FIG. 7, a stop member 50 for the objects 30.

The conveyor line 33 comprises a conveyor 51 with a double conveyor belt 51a and 51b, a slide plate 52 and, in the vicinity of the downstream end, as shown in FIG. 7, a stop member 53 for the objects 30.

These two conveyors 48 and 51 are disposed in relation to the respective rotary members 43 and 45 as described above in relation to the first embodiment.

With reference to FIG. 3, the object 30a spaced from the subsequent object 30b by means of the two lateral decelerator belts 35 and 36, is freely translated from the conveyor 34 over the rollers 37 and 39 to the fixed stop 47 disposed in the station ST2, passing freely below the first moving stop member 40 which is in the raised position.

When the rear end of the object 30a has gone beyond the vertical plane of the moving stop member 40 (which may be detected, for instance, by a sensor 54), this stop member 40 is lowered, as shown in FIG. 4, and while the object 30a encounters the stop 47, the object 30b encounters the stop 40, ensuring the correct positioning of the objects 30a, 30b in the pre-positioned cells 46 and 44 respectively.

When loading has taken place, the rotary members 45 and 43, simultaneously or separately, move by one intermittent step and the stop member 40 is raised, returning to the operating configuration for the loading of the subsequent objects 30c and 30d in the manner described above.

Figure 5:
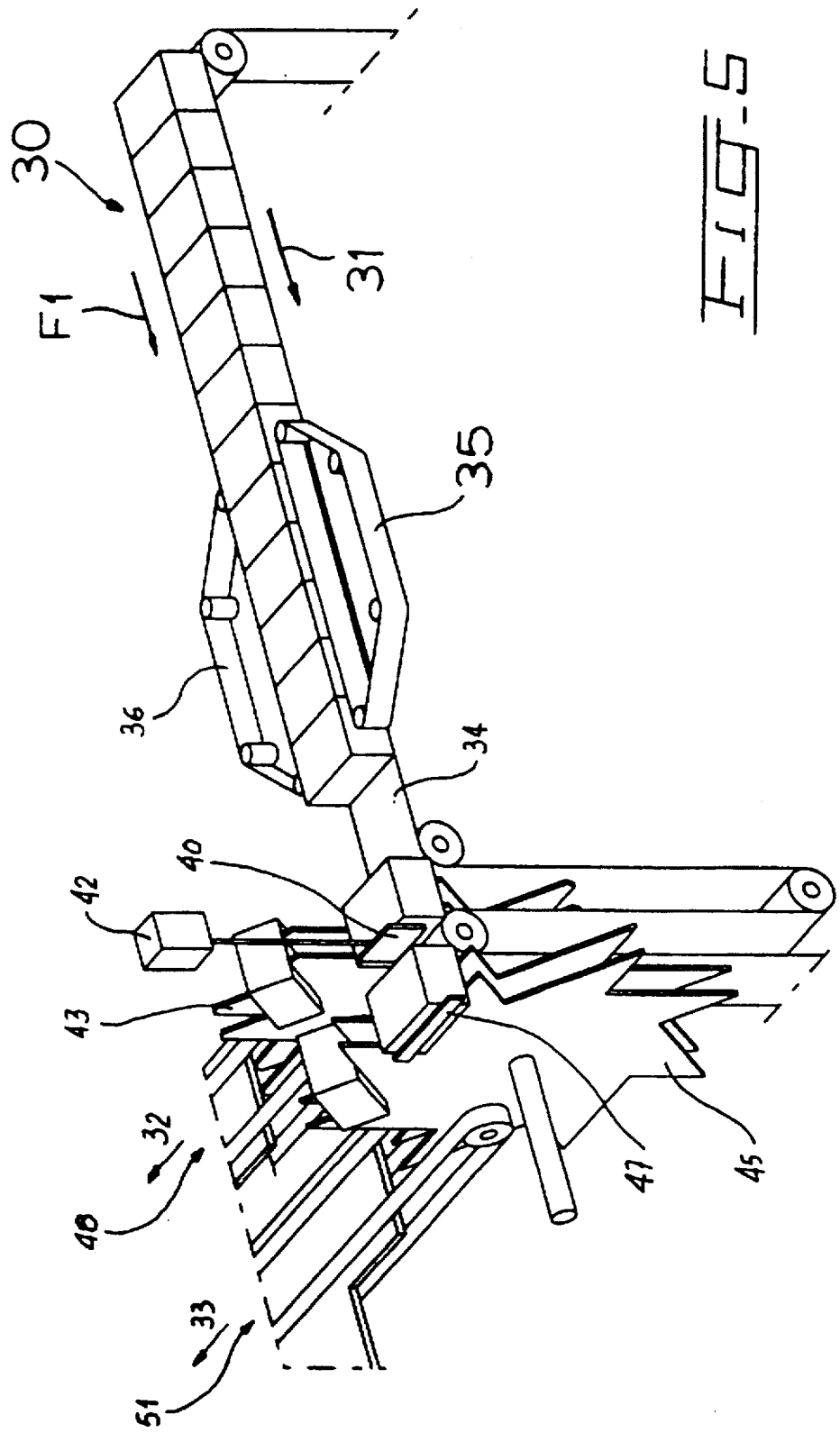
FIG. 5 is a diagrammatic perspective view of the system of FIG. 4 during a subsequent operating stage.
Figure 6:
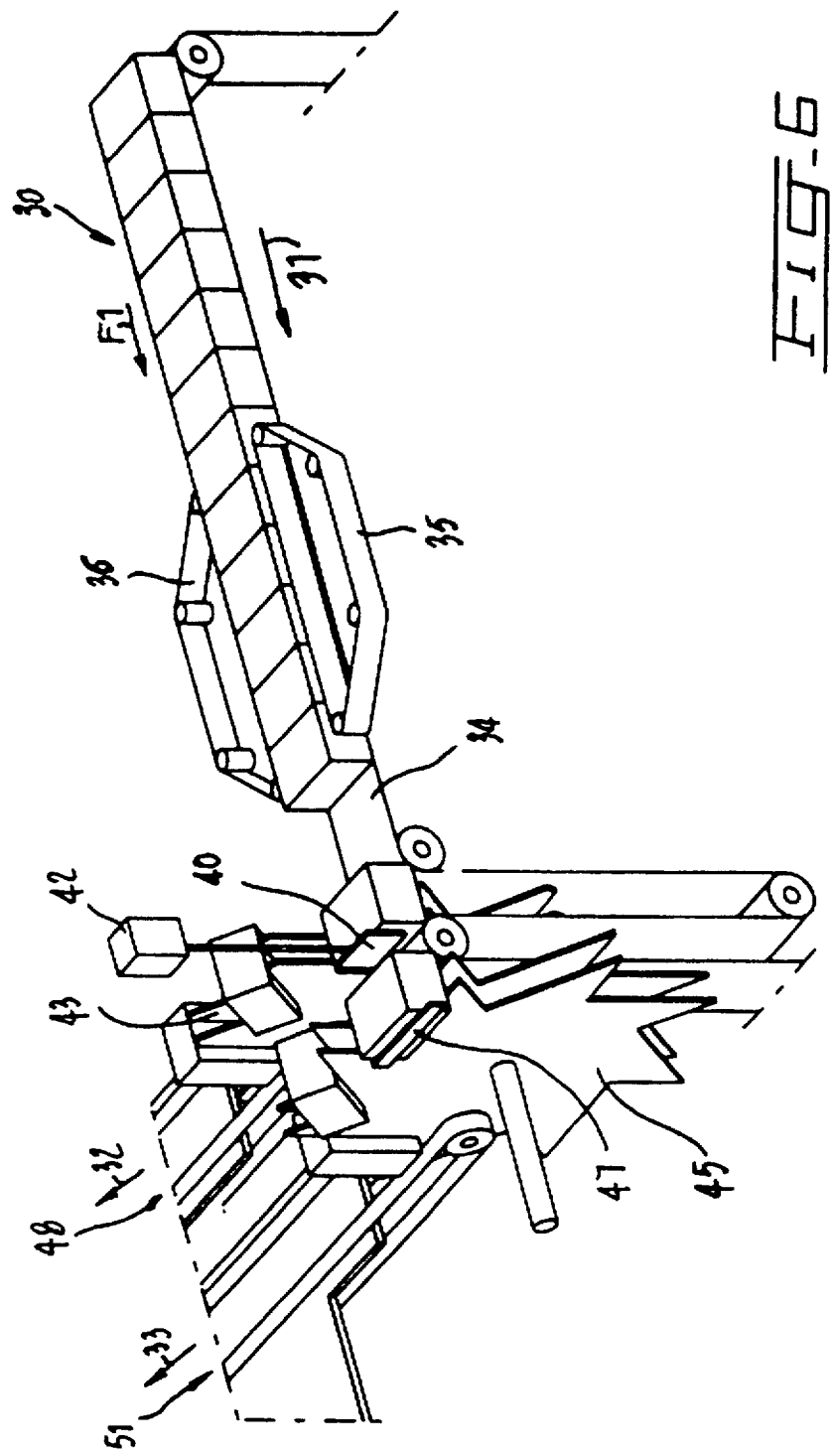
FIG. 6 is a diagrammatic perspective view of the system of FIG. 5 during a subsequent operating stage.

The objects 30a and 30b housed in the cells 46 and 44, as shown in FIG. 5, are conveyed to the second conveyor lines 32 and 33 and transferred to these, as shown in FIG. 6, in the manner described in the first embodiment, and are then aligned horizontally by the belts 51a–51b and 48a–48b, as shown in FIG. 7.

It should be noted, as regards the pair of rotary members 43 and 45 disposed in series one after the other, that these members comprise two separate axes of rotation, whose respective position is selected in relation to the position between the conveyor lines to be connected and in relation to the shape of the objects.

It should also be noted that the profiles of the cells 44 and 46 are different so that the cells are correctly disposed in the position for receiving the object 30 from the first conveyor 34 and in the position for supplying the objects 30 to the second conveyors 32 or 33.

With reference to the objects set out above and to the two embodiments described above, the use of the system of the present invention makes it possible positively to transfer objects 30 between two conveyor lines 31 and 33 disposed at a right angle to one another and at different levels and to transfer objects from a single conveyor line 31 to a plurality of second conveyor lines 32 and 33 positioned at different levels.

With reference to the embodiments of the system of the present invention, it is evident that each rotary member 17, 43, 45 comprising two adjacent disks 17a and 17b, adapted to transfer the objects 10 or 30, may be substituted by a wheel, a single disk of greater width or a crown whose radial ends comprise cells or housings 18, 44, 46 for housing the objects 10, 30, or by any other mechanical equivalent without departing from the inventive concept of the present invention.

The description of the system for the ordered transfer of objects between at least two conveyor lines disposed substantially at a right angle to one another is given purely by way of non-limiting example and it is therefore evident that all those modifications and/or variants coming within the scope of the following claims, which also form an integral part of this description, suggested by practice and/or by its embodiment or use may be made thereto.

I claim:

1. A transporting device for conveying objects, comprising:

a first closed loop conveyor delivering a plurality of objects placed in a row next to one another on the first conveyor along a first linear path lying in a first plane toward a downstream end of the first conveyor;

spacer means for spacing the objects apart from one another along the first path upstream from the downstream end;

at least one second conveyor transporting the objects delivered by the first conveyor along a second linear path lying in a plane substantially horizontally perpendicular to the first plane, the second conveyor being formed with a pair of spaced apart parallel closed-loop belts having respective upstream ends;

rotary means downstream from the spacer means and between the first and second conveyors and rotatable about an axis extending parallel to the first path for transporting the objects between the conveyors along a circular path, the rotary means being formed with a plurality of angularly spaced apart uniform cells; and sensor means for controllably actuating the rotary means upon receiving each of the objects by a respective cell from the first conveyor, a width of each object being greater than a width of the respective cell, so that each of the objects extends laterally in opposite directions over the respective cell while being transported along the circular path, the two closed-loop belts flanking the rotary means and extracting the objects from each of the cells in the vicinity of the upstream ends of the closed-loop belts upon rotation of the rotary means through the second plane.

2. The transporting device defined in claim 1 wherein the second conveyor is provided with a support extending between upper and lower stretches of the belts and slidably supporting each object extracted from the respective cells.

3. The transporting device defined in claim 1, further comprising stop means for loading each of the objects on the rotary means in a predetermined position downstream from the spacer means in which the object to be transported along the circular path lies in an extension of the second plane, the sensor means including a sensor detecting each of the objects in the predetermined position and activating the rotary means upon detecting.

4. The transporting device defined in claim 3 wherein the sensor means includes another sensor detecting the presence of the object in a respective one of the cells.

5. A transporting device for conveying objects, comprising:
- a first closed-loop conveyor having an upstream end and a downstream end for delivering a plurality of objects loaded in a row next to one another on the first conveyor along a first linear path toward a downstream end of the first conveyor;
- spacer means upstream from the downstream end for spacing the objects apart at a distance from one another along the first path;
- a plurality of transfer stations spaced apart at the distance and located downstream from the spacer means along the first path, each of the stations comprising:
  - a respective second conveyor transporting the objects received from the first conveyor along a respective linear second path extending perpendicular to the first path,
  - a respective rotary member rotatable about an axis extending parallel to the first path to transport the objects between the first conveyor and a respective upstream end of the second conveyor along a respective circular path, the rotary member being formed with a plurality of angularly spaced apart peripheral cells,
  - a respective displaceable stop member blocking the advancement of the object to be transported along the first path to load the object on a respective cell of the rotary member in a respective loading position of the stop member,
  - respective actuating means for displacing the stop member between respective loading and open positions of the stop member to allow the objects to pass toward successive transfer stations in the open position of the stop member; and
  - respective control means for detecting objects passing through the respective transfer station along the first path and operatively connected with the actuating means to move the respective stop member in the loading position.

6. The transporting device defined in claim 5, further comprising means for selectively actuating the rotary members and operatively connected with each of said control means.

7. The transporting device defined in claim 6 wherein said first conveyor is formed with at least one loop downstream of the spacer means, the respective transfer station juxtaposed with the loop having the respective rotary member extending into said loop.

8. The transporting device defined in claim 5 wherein a plurality of said second conveyors have respective upstream ends lying in different vertical planes.

9. The transporting device defined in claim 5 wherein at last one of the rotary members is formed with the respective plurality of cells having a cross section different from a cross section of the cells of other rotary members.

* * * * *